April 24, 1934.  G. H. RIDINGS ET AL  1,956,538
MEASURING RESISTANCE OF DISTANT GROUNDS FROM A CENTRAL OFFICE
Filed Nov. 21, 1932
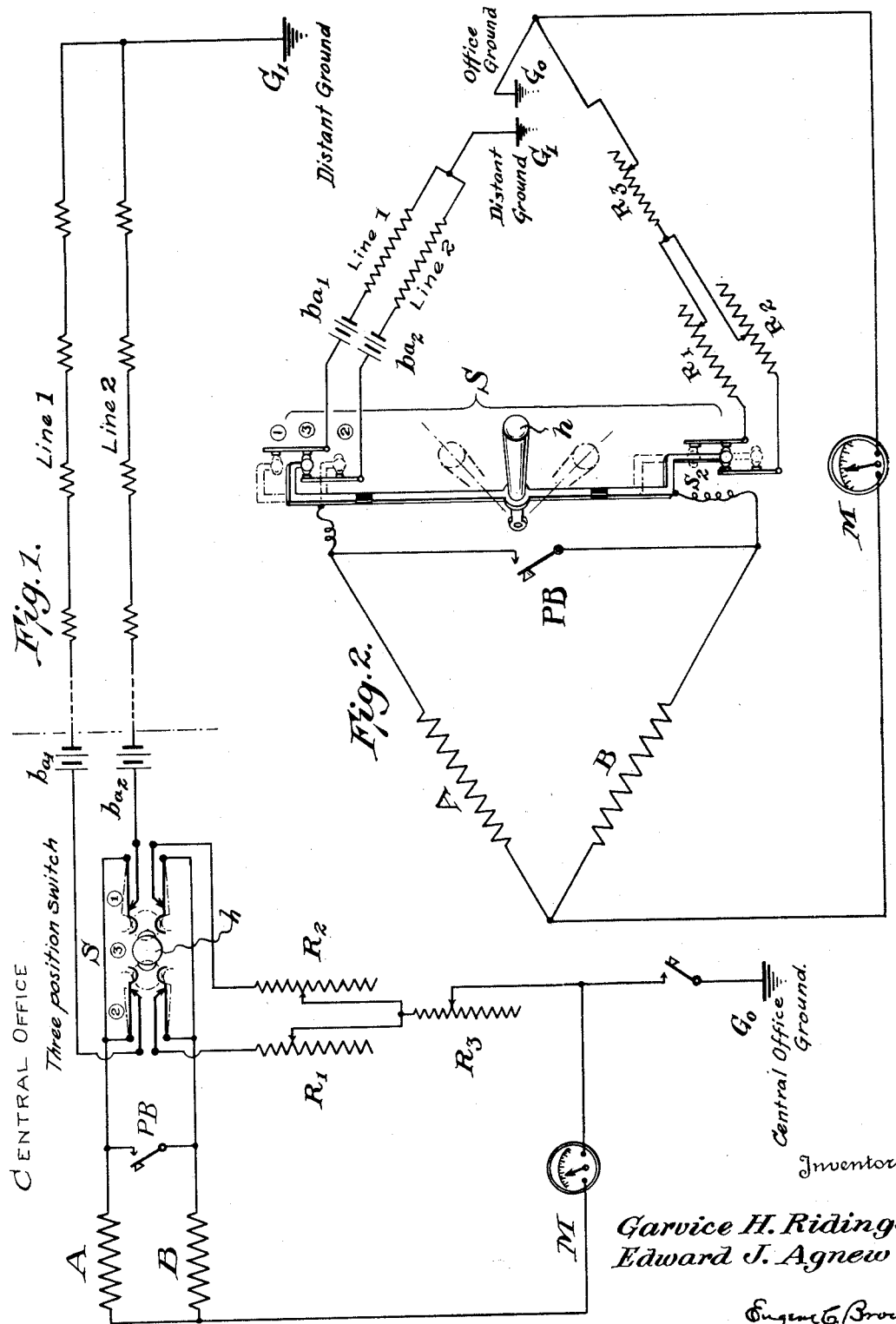
Inventor
Garvice H. Ridings
Edward J. Agnew
Eugene C. Brown
Attorney Patented Apr. 24, 1934

1,956,538

UNITED STATES PATENT OFFICE 1,956,538

MEASURING RESISTANCE OF DISTANT GROUNDS FROM A CENTRAL OFFICE

Garvice H. Ridings, Elizabeth, N. J., and Edward J. Agnew, Brooklyn, N. Y., assignors to The Western Union Telegraph Company, New York, N. Y., a corporation of New York Application November 21, 1932, Serial No. 643,786

5 Claims. (Cl. 175—183)

This invention relates to the measurement of ground connections and more particularly to an arrangement whereby the resistance of a ground located at a distance may be measured at a central office.

The measurement of resistances by prior methods has necessitated sending a man equipped with a portable measuring set to each ground location. Attempts to measure from a central station the resistance of a distant ground, such as the resistance of a ground at a waystation, a cable arrester or other protection grounds along a telegraph line have proven to be unsuccessful when there is any ground potential present between the two points or when there is any cross-fire on the line, as an error is introduced for which it is difficult to compensate.

The object of our invention is to provide a method of measuring the resistance of a distant ground by a direct reading, without the necessity for knowning the resistance of the line and which can be operated regardless of any variations due to induction or cross-fire on the line.

Our method requires the use of two lines extending between the central office and the ground to be measured. The resistance of each line plus the resistance of the two grounds in series is balanced by a variable resistance in the bridge circuit. By paralleling the lines and by paralleling the two variable resistances, the circuit is unbalanced by an amount equal to one-half the sum of the resistances of the two grounds, where A and B, the ratio arms shown in Figure 1 are equal. Since in nearly all cases the resistance of the central office ground will be low enough to be neglected, we can obtain a direct reading of the distant ground resistance by inserting sufficient known resistance in the bridge arm to bring the circuit back to a balance.

The method of obtaining a direct reading of a distant ground according to our invention will be apparent from the following description and the accompanying drawing in which Figure 1 is a diagram of the circuits involved and Figure 2 shows the same circuits arranged as a bridge network.

As indicated in the diagram, the two lines are connected in parallel to the distant ground $G_1$. At the central office the lines are connected through a three-position switch S to the bridge arms A and B and to balancing resistances $R_1$, $R_2$ and $R_3$. Equivalent batteries $ba_1$ and $ba_2$ are introduced into the line connections and an indicating instrument or meter M is connected from between the ratio arms to the opposite end of the bridge between $R_3$ and the office ground connection.

In order to determine the resistance of the distant ground $G_1$ the two lines which extend from the central station to the distant point are connected to said ground and to the apparatus at the central station in the manner indicated. Rheostat $R_3$ is first set to zero and the handle $h$ of switch S is thrown to position 1, thereby opening the right hand contacts and disconnecting line 2 and rheostat $R_2$ but leaving line 1 connected to bridge arm A and rheostat $R_1$ connected to bridge arm B through the left hand switch contacts. The circuit is balanced by adjusting rheostat $R_1$ until there is no change in the deflection on the meter M when the pushbutton switch PB is either in the open position or closed. Assuming the resistance of bridge arms A and B to be equal, the resistance $R_1$ equals the resistance of line 1 plus the resistance of the distant ground $G_1$, plus the resistance of the central office ground $G_0$.

The switch A is then thrown to position 2, thereby connecting line 2 and rheostat $R_2$ to the bridge arms and disconnecting line 1 and rheostat $R_1$. The circuit is then again balanced by adjusting rheostat $R_2$, thus making it equal to the resistance of line 2 plus the resistances of the distant ground $G_1$ and the central office ground $G_0$.

The switch S is then thrown to position 3, so that both right hand and left hand contacts are in engagement, whereby lines 1 and 2 are connected in parallel to bridge arm A and rheostats $R_1$ and $R_2$ are connected in parallel to bridge arm B. The circuit is again balanced by adjusting rheostat $R_3$, which resistance at balance equals one-half of the sum of the resistances of two grounds provided the resistances of lines 1 and 2 are equal. However if the line resistances are unequal, the error introduced is less than 1% for a 20% difference in line resistances.

The above deductions are evident from the following equations:

Assuming that $A=B$
Office ground $G_0=0$
Line $1=X$
Line $2=Y$
Set $R_3=0$

Balance $R_1$ against line 1+distant ground, then $$R_1=X+G_1$$

Similarly $$R_2=Y+G_1$$

The resistance of lines 1 and 2 in parallel is $$\frac{XY}{X+Y}.$$

The resistance of the rheostats $R_1$ and $R_2$ in parallel is $$\frac{(X+G)(Y+G)}{X+Y+2G}.$$

The circuit is balanced by adjusting the resistance $R_3$, then $$R_3+\frac{(X+G)(Y+G)}{X+Y+2G}=\frac{XY}{X+Y}+G.$$

Solving for $R_3$, we have $$R_3=\frac{G(GX+2XY+GY)}{X^2+Y^2+2(XY+GX+GY)}.$$

If the resistance of line 1 is equal to the resistance of line 2, i. e.

$$X=Y$$

Then $$R_3=\frac{G}{2}.$$

Two batteries are used, one in series with each line, so that their resistances are balanced out with the line resistances.

We claim:

1. A balanced bridge arrangement for measuring at a central office the resistance of a ground located at a point distant from the office, comprising a pair of parallel lines connected together at said ground and including a source of current in each line, a pair of ratio arms of known ratio, a pair of adjustable resistances and a third adjustable resistance connected at one end adjustably to said pair of resistances and adjustably connected at the other end to ground, said parts constituting a bridge system the four arms of which are composed respectively, of said two ratio arms, said parallel lines and the two grounds in series, and said pair of adjustable resistances in series with said third resistance.

2. A balanced bridge arrangement as set forth in claim 1 and switch means operable at will for connecting one line to one ratio arm and one of said adjustable resistances to the other ratio arm, or connecting the other line to said first mentioned ratio arm and the other adjustable resistance of said pair to said other ratio arm, and also for connecting both lines in parallel to said first mentioned ratio arm and said pair of adjustable resistances in parallel to said other ratio arm.

3. A balanced bridge arrangement as set forth in claim 1 and switch means operable at will for connecting one line to one ratio arm and one of said adjustable resistances to the other ratio arm, or connecting the other line to said first mentioned ratio arm and the other adjustable resistance of said pair to said other ratio arm, and also for connecting both lines in parallel to said first mentioned ratio arm and said pair of adjustable resistances in parallel to said other ration arm, and an auxiliary switch adapted to close a short-circuiting bridge diagonal.

4. A system for measuring at a station the resistance of a ground located at a point distant from said station, comprising a bridge including a pair of ratio arms of known ratio, a pair of lines connected together at said distant point and to said ground under test, said grounded lines and a ground at said station constituting the third arm of the bridge, and a fourth bridge arm comprising a pair of adjustable resistances and a third adjustable resistance connected adjustably at one end to said station ground and at the other end connected by independently adjustable means to the free ends of said pair of resistances.

5. A system for measuring at a station the resistance of a ground located at a point distant from said station, comprising a bridge including a pair of ratio arms of known ratio, a pair of lines connected together at said distant point and to said ground under test, said grounded lines and a ground at said station constituting the third arm of the bridge, and a fourth bridge arm comprising a pair of adjustable resistances and a third adjustable resistance connected adjustably at one end to said station ground and at the other end connected to said adjustable resistances in parallel.

GARVICE H. RIDINGS.
EDWARD J. AGNEW.